United States Patent [19]

Bernick

[11] 4,368,046

[45] Jan. 11, 1983

[54] SYSTEM FOR TEACHING TIME RECOGNITION

[76] Inventor: Herman C. Bernick, 795 Vernon Ave., Glencoe, Ill. 60022

[21] Appl. No.: 285,841

[22] Filed: Jul. 22, 1981

[51] Int. Cl.³ .............................................. G09B 19/12
[52] U.S. Cl. .................................................. 434/304
[58] Field of Search ......................................... 434/304

[56] References Cited

U.S. PATENT DOCUMENTS

| | | | |
|---|---|---|---|
| 2,635,357 | 4/1953 | Whitlock | 434/304 |
| 2,994,970 | 8/1961 | Spooner | 434/304 |
| 3,670,428 | 6/1972 | Hall | 434/304 |
| 4,124,945 | 11/1978 | Totten | 434/304 |

Primary Examiner—William H. Grieb
Attorney, Agent, or Firm—Hill, Van Santen, Steadman, Chiara & Simpson

[57] ABSTRACT

An apparatus and method for teaching time recognition utilizing a clock face construction whose face is alterable systematically and simply from one mode of scale representation to another or other modes. The variation in modes are selected to correspond to the state of time recognition learning in a given child being taught time recognition.

2 Claims, 9 Drawing Figures

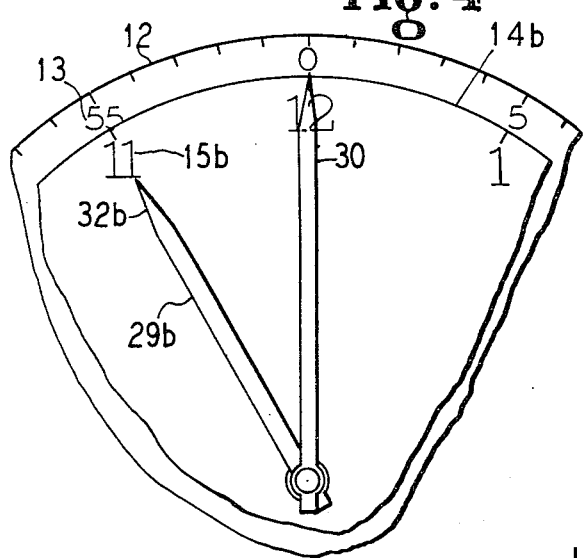
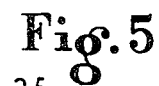
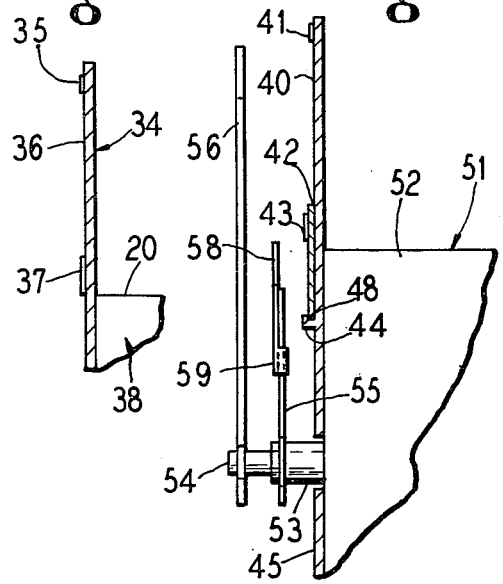
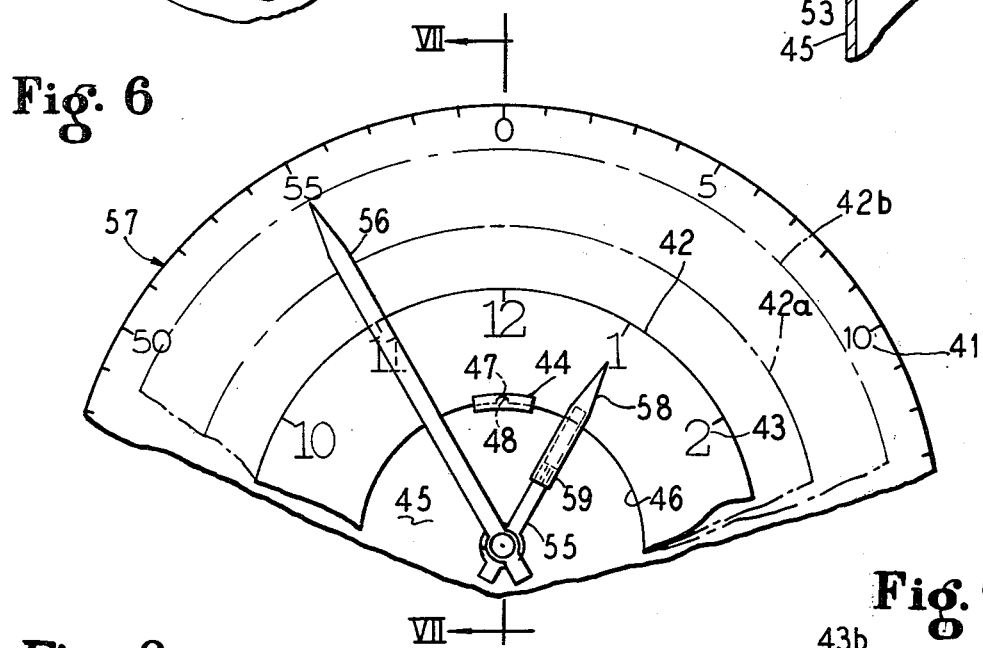
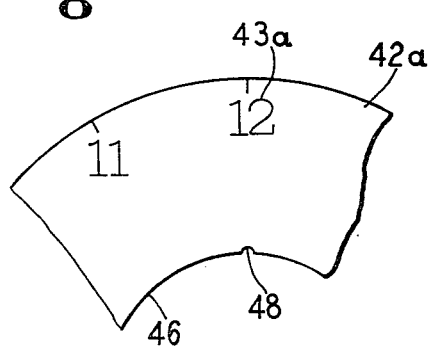

4,368,046

SYSTEM FOR TEACHING TIME RECOGNITION

BACKGROUND OF THE INVENTION

Teaching children to tell time is a difficult problem because of the inherent manner in which a clock face is laid out. While with explanation a child can grasp the idea that the little hand moves from one digit to another, thereby indicating the hour of the day, a problem arises in teaching the child that the longer minute hand has an entirely different value relationship to the numbers indicated by it (in comparison to those indicated by the short hand or hour hand).

While many different techniques for teaching time recognition have been proposed, but so far as is known no one has heretofore separated the scale for hour designations from the scale or minute and second designations significantly.

While digital clocks capable of providing a direct readout of hours, minutes (and in some cases even seconds) have now come into general use, there is still widespread use being made of the traditional clock face, so that there remains a strong need for a teaching system which will permit the learning process for time recognition using a conventional clock face to advance towards completion in a minimum amount of time.

BRIEF SUMMARY OF THE INVENTION

More particularly, the present invention relates to an improved apparatus for teaching time recognition using a clock face series and also to a method for using such apparatus to teach time recognition.

A principle aim of the present invention is to provide a simple, reliable, effective, readily comprehendible system for teaching time recognition using a clock face.

Another aim is to provide a clock construction whose face can be altered in a simple, systematic manner from one mode of scale representation to another or other modes, as desired.

In another aspect, the present invention provides a method for reaching time recognition wherein the scales on a clock face are varied from one mode of viewing to another mode of viewing with the variations in modes being selected to correspond to the state of time recognition learning in a given child being taught time recognition.

Other and further objects, purposes, advantages, aims, utilizies, features and the like will be apparent to those skilled in the art from a reading of the present specification taken together with the drawings.

BRIEF DESCRIPTION OF DRAWINGS

In the drawings:

FIG. 4 is a view similar to FIG. 3 but showing yet another such mode;

FIG. 5 is a fragmentary view similar to FIG. 2 but showing an alternative embodiment of the present invention;

FIG. 6 is a view similar to FIG. 1 but showing another alternative embodiment of the present invention;

FIG. 7 is a view similar to FIG. 2 but illustrating further the embodiment shown in FIG. 6, FIG. 7 being taken along the lines VII—VII of FIG. 6;

FIG. 8 is a fragmentary view illustrating one element utilized in the embodiment of FIGS. 6 and 7 in an alternative mode of practice; and FIG. 9 is a view similar to FIG. 8 but showing one further mode.

DETAILED DESCRIPTION

Figure 1:
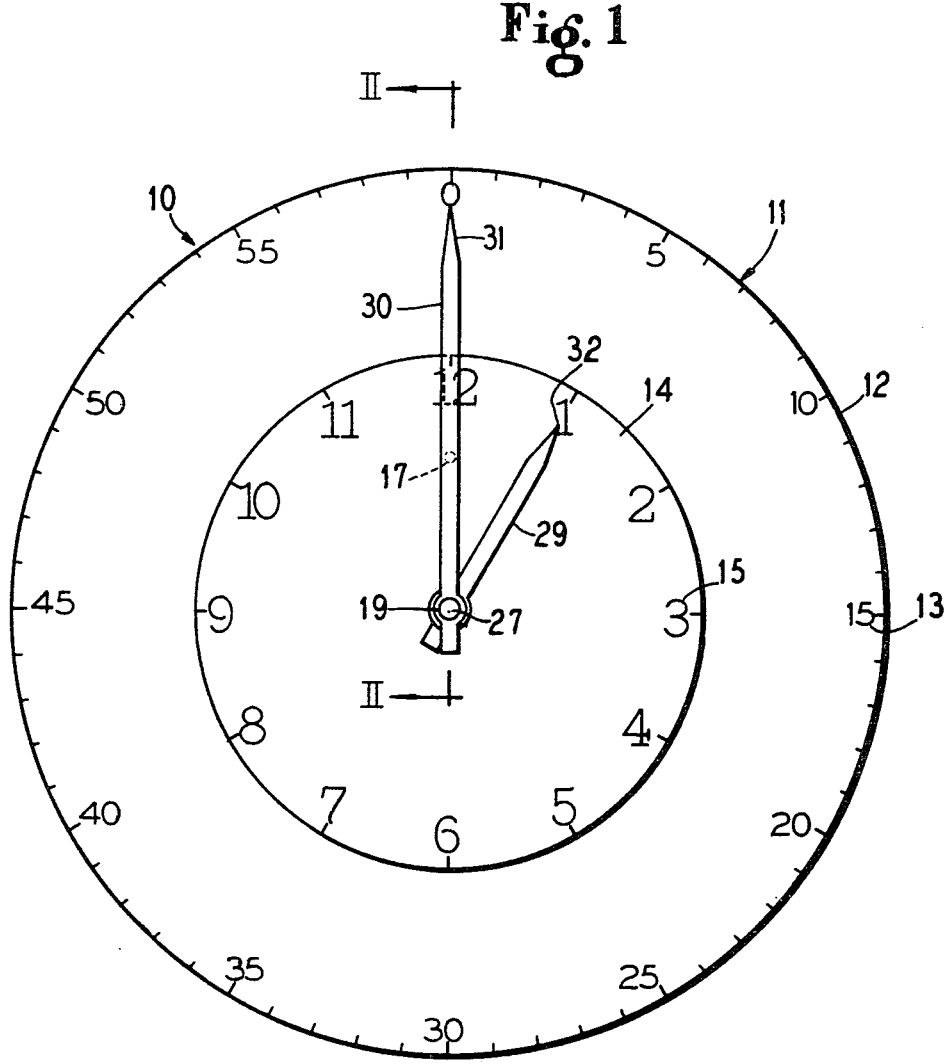
FIG. 1 is an elevational view of one embodiment of one mode of a clock whose face incorporates the principles of the present invention.

Referring to FIGS. 1-4, there is seen one clock apparatus of the present invention herein referred to in its entirety by the numeral 10, which incorporates a clock face assembly, herein designated in its entirety by the numeral 11. The clock face assembly 11, in turn, is comprised of a full diameter disk member 12 which has marked on the face thereof adjacent the circumferential edge thereof a series of equally spaced increments numbered in units of 5 up to 60, such depicting units of an hour, such numbers being referenced in their entirety by the numeral 13. The clock face assembly 11 further includes a second disk member 14 whose diameter is substantially reduced relative to the diameter of that of disk member 12. Second disk member 14 is provided on the face thereof adjacent the circumferential outer edge portions thereof with a series of twelve equally spaced increments consecutively numbered in the manner of a conventional clock face, each such number designating, as is conventional, an hour of the day, such number sequence being designated herein in its entirety for convenience by the numeral 15. Thus, each spatial increment existing between successive numerals in the number sequence 15 is equal to 5 units in the number sequence 13. The disk 14 is so oriented relative to disk 12 that the numerals of the sequence 15 are individually aligned in radially spaced relationship to the numerals (individual) of the number sequence 13, in the manner shown, for example, in FIG. 1. Any conventional means for achieving this alignment may be employed. For example, the disks 12 and 14 can be comprised of magnetized metal base portion, which are overpainted with the number sequences 13 and 15, for example. Double faced tape can be employed of the releasable type with tape being positioned between the disks 12 and 14. A locating projection 17 on disk 12 can be provided whereover a mating socket 18 can overfit can be provided, as shown, for example, in FIG. 2.

Disks 12 and 14 are coaxially apertured so as to adapt them for positioning over the drive shaft assembly 19 of a clock drive movement 20, the disk 12 being lodged in face to face engagement with the adjacent housing 21 of the clock drive movement 20. The disk member 12 is conveniently adhered to the housing 21 by any convenient means, such as through the use of pressure sensitive tape, or the like. In the embodiment shown, a mounting ear 22 extends outwardly from housing 21 and is nestingly received within a lug 23 secured to the back face 24 of the disk 12.

The drive shaft assembly 19 comprises a hollow shaft 26 which is driven at the rate of one revolution per 12 hours. Concentrically positioned and axially extending through the shaft 26 is a shaft 27 which is driven likewise by the drive movement but at a rate of one revolution per hour. Shaft 26 about its outer circumference near the outer end thereof is provided with a friction fitting hour hand 29 and the shaft 27 is provided with a friction fitting minute hand 30. The hands 29 and 30 are adapted, in the present embodiment for reasons of convenience, for manual mounting and demounting upon their respective shafts 26 and 27 through apertures appropriately formed in the shafts 29 and 30 near the proximal ends thereof, as shown in the FIGS. 1-4. The clock drive movement 20 can be of conventional construction; such movements are typically commercially available. The movement 20 can be spring driven, electric motor driven, or the like, as desired. The hands 29 and 30 can be conventionally formed of plastic, sheet metal, or the like as desired, as is also true of the disks 12 and 14.

Figure 2:
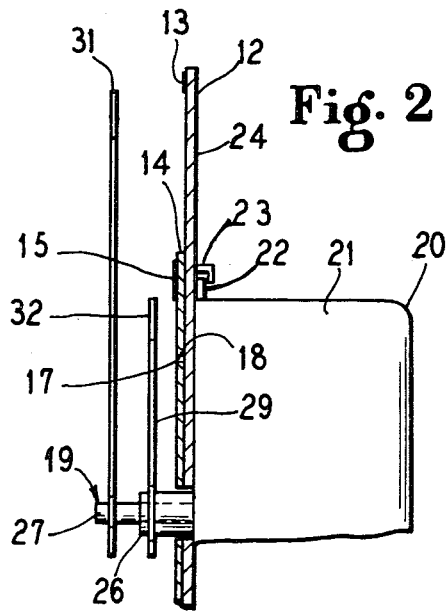
FIG. 2 is a fragmentary vertical cross-sectional view taken generally along the lines II—II of FIG. 1.

In use, the mode shown in FIGS. 1 and 2 represents a starting configuration for use in reaching system for time recognition. Observe that there is a considerable spacing between the circumferential edge portion of the disk 14 from the circumferential edge portions of the disk 12, thereby to achieve a considerably wide spacing between the respective numbering systems 13 and 15, respectively. The length of the minute hand 30 is so selected that the tip 31 thereof is in adjacent spaced relationship to the number sequence 13, and similarly the tip 32 of the hour hand 29 is so selected as to be in adjacent spaced relationship to the number sequence 15; thus, there is a clear and separate relationship between the hour hand 29 and the number sequence 15, on the one hand, as opposed to the relationship between the minute hand 30 and the number sequence 13, on the other hand, as is desired in accordance with the practice of the present invention.

Figure 3:
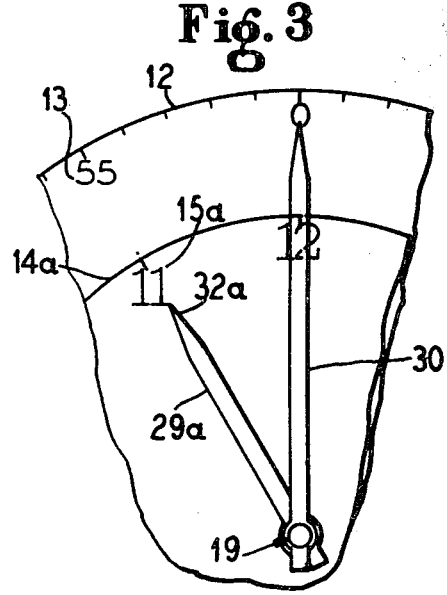
FIG. 3 is a fragmentary view showing an alternate mode for the clock face in the clock construction of FIG. 1.

A second mode for the embodiment of FIGS. 1-4 is illustrated in FIG. 3 where the disk 14 has been replaced by a disk 14a, the disk 14a being similar to the disk 14 except that the disk 14a is larger in diameter which thus causes the scale 15a of the disk 14a to be moved into a closer radial relationship to the numbering scale 13 of the disk 12. Also, in the mode shown in FIG. 3, the hour hand 29 is replaced by a longer hour hand 29a whose tip 32a is chosen so as to be in spaced, adjacent relationship to the number sequence 15a in a manner analagous to that achieved in the mode shown in FIG. 1.

A third mode for the embodiment shown in FIGS. 1-4 is illustrated in FIG. 4. Here a third disk 14b replaces the disks 14 and 14a, the disk 14b being similar in construction to, for example, disk 14 except that the diameter of the disk 14b is such as to bring the number sequence 15b thereof into a radially adjacent relationship to the number sequence 13 of the disk 12. Also, in this mode, there is employed an hour hand 29b whose tip 32b is in radially adjacent spaced relationship to the number sequence 15b analagously to the relationship between the hand 29 and the number sequence 15.

At least two modes are desired for a given embodiment of this invention, one mode differing from the other(s) in the radial spacing existing between the outer number sequence, such as sequence 13 in embodiment 10, and the respective inner number sequences, such as the graduated sequences 15, 15a and 15b in such embodiment 10. Generally less than five modes are preferred with three being presently particularly preferred.

In the preferred method of utilizing an embodiment of the present invention, such as that shown in FIGS. 1-4, a child is taught time recognition by explaining to him that the hours of the day, being divided into 12 appear in a sequentially readable manner along the scale constituting the number sequence 15 while, as an entirely separate mental concept, the minutes within each hour are divided into 60 units in the scale provided in the number sequence 13. Telling time then becomes, for the child, a simple and readily comprehendible matter of simply observing the position of the little hand 29 in relation to the number sequence 15 while thereafter and sequentially observing the position of the big hand in relation to the scale provided by the number system 13. Thus, the child reads time by merely observing the position of the tip 32 of the hour hand 29 followed by reading the position of the tip 31 of the minute hand 30.

The tendency for possible confusion of a child by the circumstance that between hours, such as between hours 1 and 2, it is impossible to tell the time elapsed since the preceding hour (here, hours) is overcome in the present teaching technique by the circumstance that the mere reading of the lowest numbered hour is the rule followed by a direct reading of the position of the minute hand 30 in relation to the number sequence 13. If desired, a color banding system can be utilized wherein a segmented color strip extending circumferentially forth from a given number towards the next number (but possibly terminating before the next number is actually reached) can be formed on the disk 14 or the like for the convenience of a particular learning program in accordance with this invention, if desired.

FIG. 5 is an alternate form of the invention embodiment shown in FIGS. 1-4. In FIG. 5 a single disk member 34 replaces both of the disks 12 and 14. The disk 34 is provided with a scale 35 adjacent its radially outer edge on a front face 36 thereof and with a second scale 37 on the same face 36 located in a considerably radially spaced relationship to the scale 35 corresponding, if desired, to the distance shown in FIG. 1 for the spacing between the number sequence 13 and the number sequence 15, for example. The disk 34 thus constitutes one mode of the apparatus which is herein called in its entirety for convenience 38. To move to the mode comparable to the second mode shown in FIG. 3, the disk 34 in the apparatus 38 is replaced by a second disk (not detailed) wherein the position of the scale 37 is altered so as to move this scale into a radially closer relationship to the scale 35 in a manner, for example, as shown in FIG. 3 of the embodiment of FIGS. 1-4.

In turn, by substituting still another disk (not detailed) for the disk 34 the scale 37 is moved to a location which is similar to that illustrated for the scale 15b in FIG. 4 of the embodiment of FIGS. 1-4.

Referring to FIGS. 6 through 9, there is seen a third embodiment of the present invention. Here a disk 40 is provided which has a scale 41 comparable to the numbering system 13 of the disk 12 in the embodiment of FIGS. 1-4. A flattened toroidally shaped member 42 is mounted on the face of the disk 41 and the toroidally shaped member 42 is provided around its circumferentially outer edge portions adjacent the face 43 thereof with a numbering scale extending from 1-12 which is similar to the numbering scale 15 of the disk 14 in the embodiment of FIGS. 1-4.

Here a locating and mounting clip 44 is provided on the front face 45 of the disk 40. Preferably at least two and more preferably at least three such clips 44 are provided with the spacing between circumferentially adjacent clips being preferably substantially equal. These clips 44 approximate the inner circumferential edge 46 of the toroidally shaped member 42.

At least one of the clips 44 in any given case is preferably provided with a locating rib 47 which is adapted to mate with a corresponding locating notch 48 in the edge 46 of the member 42. In this way, the position of the member 42 relative to the disk 40 is easily and simply established and controlled.

The disk 40 is mounted in face to face engagement with the housing 51 of a clock drive movement 52. The mounting of the disk 40 relative to the housing 52 can be accomplished in a manner as described above in relation to FIGS. 1-4, or otherwise, if desired. The drive movement 51 is provided with a hollow shaft 53 adapted to revolve at the rate of one revolution per 12 hours. A minute shaft coaxially extending through the hour shaft 53 is adapted to revolve at the rate of one revolution per hour. Mounted over the terminal exposed end portions of each respective shaft 53 and 54 is, respectively, an hour hand 55 and a minute hand 56. Any convenient method of mounting the hand to their associate shafts can be employed; for example, mere friction fitting arrangements similar to those employed in the embodiment of FIGS. 1-4 is presently preferred for reasons of simplicity. With the hands 55 and 56 in place, the toroidally shaped member 42 is simply extended thereover without removing the hands from their respective shafts 53 and 54. Once the member 42 is between the hands 55 and 56 on the one hand and the disk 40 on the other hand, the member 42 is simply located and pivoted about its axis until the inner edge 46 thereof is brought into aligned relationship with the clips 44, the locating rib 47 being coveniently aligned with the locating notch 48. A simple snap-on fitting relationship between the edge 46 and the clips 44 is preferably provided, for reasons of simplicity. The disk 42 may be simply removed from its engagement adjacent the face of disk 40 by simply elevating an outside edge portion of the member 42 until the time when a disengagment is achieved between the edge 46 and each clip 44. The embodiment shown in FIGS. 6 and 7 represents a first mode for this embodiment of the invention herein termed in entirety by the numeral 56. A second mode for embodiment 56 is provided by the utilization of a second toroidally shaped member 42a as shown in FIG. 8. The member 42a has an internal edge 46 which is identical to the internal edge 46 of the member 42, also, the toroidally shaped member 42a is similarly provided with a numbering scale 43a comparable to the numbering scale 43 of the disk 42 and also with a locating notch 48 which is identical to the notch 48 found in the member 42. The scale 43a owing to the larger circumference of the member 42a then the circumference of the member 42 is in radially closer relationship to the numbering scale 41 of the disk 40.

The end 58 of the hour hand 55 is defined by a pointed sleeve 59 which is slidably engaged with the main body portion of the hour hand 55. The end 58 is so constructed as to be in a desired radially spaced adjacent relationship to the scale 43 when the number 42 is duly mounted as described on the face 45 of disk 40. When, however, for example, the member 42a has replaced the member 42 on the disk 40, the point or end 58 is extended into a desired spaced radially adjacent relationship to the scale 42a by merely slidably extending the sleeve 59 on the hour hand 55.

A third mode for the embodiment 56 is provided by the use of a third toroidally shaped member 42b as shown in fragmentary form, for example, in FIG. 9. The member 42b is similar to the member 42a, except that the diameter of the member 42b is larger than that of 42b so that the scale 43b is brought into a desired radially proximate relationship to the numbering scale 41 of the disk 40. The end 58 of the hour hand 55 is then extended so as to be in a desired approximate relationship to the scale 42b, as indicated for the scales 43 and 43a.

The method of using the embodiment of FIG. 5 and the embodiment of FIGS. 6-9 is the same, substantially, as above-described for the method of practicing the embodiment of FIGS. 1-4, preferably, with the exception of the fixing of the members 42, 42a and 42b to the disk 40, as those skilled in the art will appreciate.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth in the hereto appended claims.

I claim:

1. Apparatus for teaching time recognition comprising:
    (A) a clock drive movement including an hour shaft and coaxial minute shaft driven thereby,
    (B) a plurality of clock face means, each one of such clock face means being associatable with said clock drive movement, having an outer circumferentially extending scale marked in 60 equal increments and having an inner circumferentially extending scale marked in 12 equal increments, said inner scale being radially spaced from said outer scale and having each increment thereof radially alignable with a different one of every five increments of said outer scale, each one of such clock face means of said plurality having a different such radial spacing between such outer scale and such inner scale,
    (C) a minute hand associated with said minute shaft and having a length adapted to indicate specific locations along such outer scale, and
    (D) hour hand means associatable with said hour shaft and having the capacity to be extended and retracted in length for adopting said hour hand means to indicate respective specific locations along a different prechosen one of said inner scales in said clock face plurality.

2. A method for teaching time recognition comprising the sequential steps of:
    (A) training a child to tell time by reading an hour hand position on a clock face in reference to an hour scale indicated by said hour hand and by further reading a minute hand position on such clock face in reference to a minute scale indicaterd by said minute hand, said minute scale being spaced outwardly a substantial radial distance from said hour scale,
    (B) shortening the radial distance between said hour scale and said minute scale by enlarging the effective diameter of said hour scale and lengthening the effective indicating length of said hour hand, and
    (C) repeating step (A).

* * * * *